United States Patent
Tajiri et al.

(10) Patent No.: US 9,690,013 B2
(45) Date of Patent: Jun. 27, 2017

(54) RESIN COMPOSITION FOR OPTICAL MATERIAL, OPTICAL FILM, AND LIQUID CRYSTAL DISPLAY DEVICE

(71) Applicant: DIC Corporation, Tokyo (JP)

(72) Inventors: Yusuke Tajiri, Ichihara (JP); Takanori Ootsubo, Ichihara (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/022,702

(22) PCT Filed: Sep. 18, 2014

(86) PCT No.: PCT/JP2014/074669
§ 371 (c)(1),
(2) Date: Mar. 17, 2016

(87) PCT Pub. No.: WO2015/046010
PCT Pub. Date: Apr. 2, 2015

(65) Prior Publication Data
US 2016/0231465 A1    Aug. 11, 2016

(30) Foreign Application Priority Data

Sep. 27, 2013  (JP) ................................ 2013-201478

(51) Int. Cl.
| | | |
|---|---|---|
| *C08G 63/02* | (2006.01) | |
| *G02B 1/14* | (2015.01) | |
| *C08J 5/18* | (2006.01) | |
| *C08G 63/183* | (2006.01) | |
| *C08L 33/10* | (2006.01) | |
| *C08L 67/00* | (2006.01) | |
| *G02B 1/04* | (2006.01) | |
| *C08L 33/06* | (2006.01) | |
| *G02F 1/1335* | (2006.01) | |
| *C08L 33/12* | (2006.01) | |
| *C08G 64/00* | (2006.01) | |

(52) U.S. Cl.
CPC ............. *G02B 1/14* (2015.01); *C08G 63/183* (2013.01); *C08J 5/18* (2013.01); *C08L 33/062* (2013.01); *C08L 33/10* (2013.01); *C08L 33/12* (2013.01); *C08L 67/00* (2013.01); *G02B 1/04* (2013.01); *G02F 1/133528* (2013.01); *C08J 2333/02* (2013.01); *C08J 2333/04* (2013.01); *G02F 2201/50* (2013.01)

(58) Field of Classification Search
CPC ...................................................... C08G 63/605
USPC ............ 430/20, 631; 528/176, 188; 524/174
See application file for complete search history.

(56) References Cited

U.S. PATENT DOCUMENTS 6,210,872 B1 *  4/2001  Hosaki ................. C08G 63/605
                                                        430/20
2006/0292315 A1   12/2006  Inagaki

FOREIGN PATENT DOCUMENTS

WO    WO-2006/077776 A1    7/2006

OTHER PUBLICATIONS

International Search Report mailed Jan. 6, 2015, issued for PCT/JP2014/074669.
Chinese Office Action, dated Nov. 30, 2016, on corresponding CN Patent Application No. 201480053332.4.

\* cited by examiner

*Primary Examiner* — Terressa Boykin
(74) *Attorney, Agent, or Firm* — Locke Lord LLP

(57) ABSTRACT

An object of the present invention is to provide a resin composition that exhibits only a small change in birefringence due to external force and can be suitably used for production of optical members and to provide an optical film obtained by using the resin composition and a liquid crystal display device using the optical film. The provided resin composition for an optical material contains: a polymer (A) obtained by using (meth)acrylic acid or an alkyl(meth)acrylate; and a polyester resin (B). The polyester resin (B) is a polyester resin (B1) that has, in a main chain thereof, an aromatic ring-containing structural unit and has a number average molecular weight of 300 to 5,000, and each end of the main chain is capped with a monocarboxylic acid residue or a monoalcohol residue.

9 Claims, No Drawings

RESIN COMPOSITION FOR OPTICAL MATERIAL, OPTICAL FILM, AND LIQUID CRYSTAL DISPLAY DEVICE

TECHNICAL FIELD

The present invention relates to a resin composition that exhibits only a small change in birefringence due to external force and can be suitably used for production of optical members, to an optical film obtained by using the resin composition, and to a liquid crystal display device using the optical film.

BACKGROUND ART

The recent growth in the market for displays has led to an increasing demand for higher definition images, and there is a need for optical materials that are not ordinary transparent materials but are optical materials having highly controlled optical properties.

Generally, a polymer exhibits birefringence because the refractive index of the polymer in a direction of its main molecular chain is different from the refractive index in a direction perpendicular thereto. In some applications, there is a need to control the birefringence precisely. Among components formed from macromolecular materials having the same total light transmittance, components formed from macromolecular materials having a smaller birefringence are required for protective films used for polarizing plates for liquid crystals. Triacetylcellulose is one of the representative materials used.

Under the foregoing circumstances, liquid crystal displays have increased in size in recent years, and this leads to an increase in size of their necessary components formed from macromolecular optical materials. In view of the above, there is a need for a material that exhibits only a small change in birefringence due to external force in order to reduce birefringence distribution caused by uneven external force.

Specifically, materials forming components that exhibit only a small change in birefringence due to external force are macromolecular optical materials that form components having a small photoelastic coefficient. Among such materials, acrylic-based resins are receiving attention as low-cost materials. One specific known material is a resin composition containing an acrylic-based resin and an aliphatic polyester-based resin serving as a plasticizer (see, for example, PTL 1). However, it has been difficult to obtain an optical film having a sufficiently small photoelastic coefficient even when the optical material disclosed in PTL 1 is used.

CITATION LIST

Patent Literature

PTL 1: WO2006/077776

SUMMARY OF INVENTION

Technical Problem

An object of the present invention is to provide a resin composition that exhibits only a small change in birefringence due to external force and can be suitably used for production of optical members and to provide an optical film obtained by using the resin composition and a liquid crystal display device using the optical film.

Solution to Problem

The present inventors have conducted extensive studies and found the following. An optical member that exhibits only a small change in birefringence due to external force can be obtained by using a resin composition containing an acrylic-based resin and a polyester resin wherein the polyester resin used has an aromatic ring structure in its main chain having a capped end and has a molecular weight within a specific range. This resin composition is suitable for production of, particularly, an optical film, and the optical film can be suitably used as a member for producing a liquid crystal display device. Thus, the present invention has been completed.

Accordingly, the present invention provides a resin composition for an optical material. The resin composition comprises a polymer (A) obtained by using (meth)acrylic acid or an alkyl (meth)acrylate and a polyester resin (B). In the resin composition, the polyester resin (B) is a polyester resin (B1) that has, in a main chain thereof, an aromatic ring-containing structural unit and has a number average molecular weight of 300 to 5,000, and an end of the main chain is capped with a monocarboxylic acid residue or a monoalcohol residue.

The present invention also provides an optical film comprising the resin composition for an optical material.

The present invention further provides a liquid crystal display device comprising the optical film.

Advantageous Effects of Invention

According to the present invention, a resin composition that exhibits only a small change in birefringence due to external force and can be suitably used for production of optical members can be provided using an acrylic-based resin, which is a low-cost material. The use of this resin composition allows an optical film that exhibits only a small change in birefringence due to external force to be easily obtained. The use of this optical film allows a liquid crystal display device that resists a change in displayed image due to external force to be obtained.

DESCRIPTION OF EMBODIMENTS

The polymer (A) used in the present invention is obtained by using (meth)acrylic acid or an alkyl (meth)acrylate. Specifically, the polymer (A) is obtained by polymerization of an essential ingredient, i.e., (meth)acrylic acid or an alkyl (meth)acrylate, and, if necessary, an additional polymerizable monomer. Examples of the (meth)acrylic acid and the alkyl (meth)acrylate include: acrylic acid; methacrylic acid; alkyl methacrylates such as cyclohexyl methacrylate, t-butylcyclohexyl methacrylate, and methyl methacrylate; and alkyl acrylates such as methyl acrylate, ethyl acrylate, butyl acrylate, isopropyl acrylate, and 2-ethylhexyl acrylate.

Preferably, the polymer (A) used in the present invention is a polymer obtained by using methyl methacrylate, specifically a homopolymer of methyl methacrylate or a copolymer of methyl methacrylate with an additional monomer because a film excellent in optical characteristics is obtained. In addition, this film is economically advantageous.

Examples of the additional monomer include: (meth)acrylic acid and (meth)acrylates other than methyl methacrylate; aromatic vinyl compounds such as styrene, vinyl-toluene, and α-methylstyrene; vinyl cyanides such as acrylonitrile and methacrylonitrile; maleimides such as N-phenylmaleimide and N-cyclohexylmaleimide; unsaturated carboxylic acid anhydrides such as maleic anhydride; and unsaturated acids such as maleic acid.

Even when methyl methacrylate is not used, monomers such as aromatic vinyl compounds, vinyl cyanides, maleimides, unsaturated carboxylic acid anhydrides, and unsaturated acids listed as examples of the additional monomer can be used so long as the advantageous effects of the present invention are not impaired.

When a polymer used as the polymer (A) is obtained by copolymerizing methyl methacrylate and the additional monomer, the additional monomer is preferably an aromatic vinyl compound because an optical film having high heat resistance and economic efficiency is obtained. Particularly, styrene or α-methylstyrene is more preferred. The amount of the aromatic vinyl compound used is preferably 1 to 50 parts by mass and more preferably 2 to 30 parts by mass based on 100 parts by mass of methyl methacrylate.

When an unsaturated carboxylic acid anhydride is used as the additional monomer, the effect that an optical film having high heat resistance is obtained can be expected. The unsaturated carboxylic acid anhydride is preferably maleic anhydride. The amount of the unsaturated carboxylic acid anhydride used is preferably 1 to 100 parts by mass and more preferably 5 to 90 parts by mass based on 100 parts by mass of methyl methacrylate.

The polymer (A) used in the present invention may be (meth)acrylic acid or an alkyl (meth)acrylate alone or may be a combination of two or more types thereof. One of the additional monomers may be used alone, or a combination of two or more types may be used.

The weight average molecular weight of the polymer (A) used in the present invention is preferably 50,000 to 200,000 because a component such as a high-strength optical film can be formed and a resin composition having sufficient flowability and good formability is obtained. The weight average molecular weight is more preferably 70,000 to 150,000.

The number average molecular weight of the polymer (A) used in the present invention is preferably 15,000 to 100,000 and more preferably 20,000 to 50,000.

In the present invention, the weight average molecular weight (Mw) and the number average molecular weight (Mn) are polystyrene-equivalent values based on GPC measurement. The conditions for the GPC measurement are as follows.

[GPC Measurement Conditions]
Measurement device: "HLC-8220GPC" manufactured by TOSOH Corporation
Columns: Guard Column "HHR-H" (6.0 mm I.D.×4 cm) manufactured by TOSOH Corporation+"TSK-GEL GMHHR-N" (7.8 mm I.D.×30 cm) manufactured by TOSOH Corporation+"TSK-GEL GMHHR-N" (7.8 mm I.D.×30 cm) manufactured by TOSOH Corporation+"TSK-GEL GMHHR-N" (7.8 mm I.D.×30 cm) manufactured by TOSOH Corporation+"TSK-GEL GMHHR-N" (7.8 mm I.D.×30 cm) manufactured by TOSOH Corporation
Detector: ELSD ("ELSD 2000" manufactured by Alltech)
Data processing: "GPC-8020 model II data analysis version 4.30" manufactured by TOSOH Corporation
Measurement conditions: Column temperature: 40° C.
Eluent: Tetrahydrofuran (THF)
Flow rate: 1.0 mL/min
Sample: Solution (5 µL) prepared by filtrating tetrahydrofuran solution of resin with concentration of 1.0% by mass in terms of resin solid content through microfilter
Standard samples: The following monodispersed polystyrenes with known molecular weights are used in accordance with the measurement manual of the "GPC-8020 model II data analysis version 4.30".
(Monodispersed Polystyrenes)
"A-500" manufactured by TOSOH Corporation
"A-1000" manufactured by TOSOH Corporation
"A-2500" manufactured by TOSOH Corporation
"A-5000" manufactured by TOSOH Corporation
"F-1" manufactured by TOSOH Corporation
"F-2" manufactured by TOSOH Corporation
"F-4" manufactured by TOSOH Corporation
"F-10" manufactured by TOSOH Corporation
"F-20" manufactured by TOSOH Corporation
"F-40" manufactured by TOSOH Corporation
"F-80" manufactured by TOSOH Corporation
"F-128" manufactured by TOSOH Corporation
"F-288" manufactured by TOSOH Corporation
"F-550" manufactured by TOSOH Corporation Various polymerization methods such as cast polymerization, bulk polymerization, suspension polymerization, solution polymerization, emulsion polymerization, and anionic polymerization can be used to produce the polymer (A) used in the present invention. Among these production methods, bulk polymerization and solution polymerization are preferred because a polymer with a reduced amount of fine foreign bodies mixed therein can be obtained. When solution polymerization is performed, a solution prepared by dissolving a mixture of raw materials in an aromatic hydrocarbon solvent such as toluene or ethylbenzene can be used. When polymerization is performed using bulk polymerization, the polymerization can be initiated in a commonly-used manner, i.e., by free radicals generated by heating or irradiation with ionizing radiation.

An initiator used for the polymerization reaction may be any initiator generally used for radical polymerization, and examples of the initiator include: azo compounds such as azobisisobutylnitrile; and organic peroxides such as benzoyl peroxide, lauroyl peroxide, and t-butylperoxy-2-ethylhexanoate. When polymerization is performed at a high temperature of 90° C. or higher, solution polymerization is generally used. In this case, peroxides, azobis initiators, etc., having a 10-hour half-life temperature of 80° C. or higher and soluble in the organic solvent used are preferred. Specific examples include 1,1-bis(t-butylperoxy)3,3,5-trimethylcyclohexane, cyclohexane peroxide, 2,5-dimethyl-2,5-di (benzoylperoxy)hexane, 1,1-azobis(1-cyclohexanecarbonitrile), and 2-(carbamoylazo) isobutyronitrile. These initiators are used in an amount within the range of 0.005 to 5% by mass.

When the polymer (A) used in the present invention is polymerized, a molecular weight modifier may be used if necessary. The molecular weight modifier may be any molecular weight modifier used for general radical polymerization, and particularly preferred examples include mercaptan compounds such as butyl mercaptan, octyl mercaptan, dodecyl mercaptan, and thioglycolic acid 2-ethylhexyl ester. These molecular weight modifiers are added within a concentration range in which the degree of polymerization is controlled within the above-described range.

The polyester resin (B1) used in the present invention is a polyester resin that has a number average molecular weight of 300 to 5,000 and has an aromatic ring-containing structural unit in its main chain, and each end of the main chain is capped with a monocarboxylic acid residue or a monoalcohol residue. When the main chain contains the aromatic ring-containing structural unit, the effect of reducing the absolute value of the photoelastic coefficient of the resin composition can be achieved with a small amount of the polyester resin (B1) added. By capping the ends of the main chain with a monocarboxylic acid or monoalcohol residue, good compatibility with the polymer (A) is achieved. Specifically, an optical film having high transparency and optimal for an optical member can be provided.

It is necessary that the number average molecular weight (Mn) of the polyester resin (B1) used in the present invention be 300 to 5,000. An (Mn) of less than 300 is not preferable because the effect of the present invention, i.e., a reduction in the absolute value of the photoelastic coefficient of the resin composition, is difficult to achieve satisfactorily and because the heat resistance of the resin composition deteriorates significantly. An (Mn) of larger than 5,000 is not preferable because the compatibility with the polymer (A) becomes poor and a reduction in transparency and bleeding occur, so that a composition optimal for producing an optical film is unlikely to be obtained.

The (Mn) of the polyester resin (B1) used in the present invention is more preferably 350 to 3,000.

Examples of the polyester resin (B1) used in the present invention include polyester resins represented by the following general formulas.

$$B\text{-}(G_1\text{-}A_1)_n\text{-}G_1\text{-}B \quad (1)$$

$$B\text{-}(G_2\text{-}A_2)_n\text{-}G_2\text{-}B \quad (2)$$

$$B\text{-}(G_2\text{-}A_1)_n\text{-}G_2\text{-}B \quad (3)$$

$$B_1\text{-}(G_1\text{-}A_2)_n\text{-}G_1\text{-}B_1 \quad (4)$$

Here, B represents an aryl monocarboxylic acid residue having 6 to 12 carbon atoms or an aliphatic monocarboxylic acid residue having 1 to 8 carbon atoms, and $B_1$ represents an aryl monocarboxylic acid residue having 6 to 12 carbon atoms. $G_1$ represents an alkylene glycol residue having 2 to 12 carbon atoms or an oxyalkylene glycol residue having 4 to 12 carbon atoms, and $G_2$ represents an aryl glycol residue having 6 to 18 carbon atoms. $A_1$ represents an aryl dicarboxylic acid residue having 6 to 12 carbon atoms, and $A_2$ represents an alkylene dicarboxylic acid residue having 2 to 12 carbon atoms. n is 1 to 30.

The polyester resin (B1) used in the present invention is preferably a polyester resin represented by general formula (1) or (2) and more preferably a polyester resin represented by general formula (1) because the absolute value of the photoelastic coefficient can be reduced and an optical film having high transparency can be provided.

The polyester resin represented by any of general formulas (1) to (4) can be obtained by any of the following methods.

Method 1: A monocarboxylic acid, a dicarboxylic acid, and a glycol forming the residues in one of general formulas (1) to (4) are charged at once and then allowed to react.

Method 2: A dicarboxylic acid and a glycol forming residues in one of general formulas (1) to (4) are reacted under the conditions in which the number of equivalents of hydroxyl groups is larger than the number of equivalents of carboxyl groups to thereby obtain a polyester resin having a hydroxyl group at each end of the main chain. Then this polyester resin is reacted with a monocarboxylic acid or a monocarboxylic acid derivative forming the residue B or $B_1$.

Examples of the aryl monocarboxylic acid having 6 to 12 carbon atoms that is a raw material forming the B include benzoic acid, dimethylbenzoic acid, trimethylbenzoic acid, tetramethylbenzoic acid, ethylbenzoic acid, propylbenzoic acid, butylbenzoic acid, cumic acid, p-tert-butylbenzoic acid, o-toluic acid, m-toluic acid, p-toluic acid, ethoxybenzoic acid, propoxybenzoic acid, naphthoic acid, nicotinic acid, furoic acid, anisic acid, and methyl esters and acid chlorides thereof. These may be used alone or in combination of two or more types.

Examples of the aliphatic monocarboxylic acid having 1 to 8 carbon atoms include acetic acid, propionic acid, butanoic acid, hexanoic acid, octanoic acid, and octylic acid. These may be used alone or in combination of two or more types.

Of these, p-toluic acid and benzoic acid are more preferred because the polyester resin (B1) obtained has high compatibility with the polymer (A). In the present invention, the "number of carbon atoms" is the number of carbon atoms excluding carbonyl carbon.

Examples of the $B_1$ include the aryl monocarboxylic acid residues having 6 to 12 carbon atoms listed as the examples of the B. These may be used alone or in combination of two or more types.

Examples of the alkylene glycol having 2 to 12 carbon atoms that is a raw material forming the $G_1$ include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3 propanediol (3,3-dimethylolheptane), 3-methyl-1,5-pentanediol, 1,6-hexanediol, 2,2,4-trimethyl 1,3-pentanediol, 2-ethyl-1,3-hexanediol, 2-methyl-1,8-octanediol, 1,9-nonanediol, 1,10-decanediol, and 1,12-dodecanediol. These may be used alone or in combination of two or more types. Of these, ethylene glycol, 1,2-propylene glycol, 1,3-propylene glycol, 1,2-butanediol, 1,3-butanediol, and 2-methyl-1,3-propanediol are preferred because the polyester resin (B1) obtained has high compatibility with the polymer (A). Ethylene glycol and 1,2-propylene glycol are more preferred.

Examples of the oxyalkylene glycol having 4 to 12 carbon atoms that is a raw material forming the $G_1$ include diethylene glycol, triethylene glycol, tetraethylene glycol, dipropylene glycol, and tripropylene glycol. These may be used alone or in combination of two or more types.

Examples of the aryl glycol having 6 to 18 carbon atoms that is the raw material forming the $G_2$ include hydroquinone, resorcin, bisphenol A, alkylene oxide adducts of bisphenol A, bisphenol F, alkylene oxide adducts of bisphenol F, biphenol, and alkylene oxide adducts of biphenol. These may be used alone or in combination of two or more types.

Examples of the aryl dicarboxylic acid that is the raw material forming the $A_1$ include phthalic acid, terephthalic acid, isophthalic acid, and dimethyl terephthalate. These may be used alone or in combination of two or more types. Of these, terephthalic acid and dimethyl terephthalate are preferred because the absolute value of the photoelastic coefficient of the resin composition can be reduced with a small amount of the polyester resin (B1) added.

Specifically, the polyester resin (B1) used in the present invention is more preferably a polyester resin in which B in general formula (1) is a benzoic acid residue or a p-toluic acid residue, $G_1$ is an ethylene glycol residue or a propylene glycol residue, and $A_1$ is a terephthalic acid residue or a dimethyl terephthalate residue.

The acid value of the polyester resin (B1) used in the present invention is preferably 5 or less and more preferably 1 or less because the polyester resin (B1) obtained has high compatibility with the polymer (A). The hydroxyl value of the polyester resin (B1) is preferably 50 or less and more preferably 20 or less because the polyester resin (B1) obtained has high compatibility with the polymer (A).

The polyester resin (B1) used in the present invention can be produced by, for example, subjecting the raw materials described above to an esterification reaction in the temperature range of, for example, 180 to 250° C. for 10 to 25 hours in the presence of an esterification catalyst, if necessary. No particular limitation is imposed on the esterification reaction conditions such as temperature and time, and these may be set appropriately.

Examples of the esterification catalyst include: titanium-based catalysts such as tetraisopropyl titanate and tetrabutyl titanate; tin-based catalysts such as dibutyl tin oxide; and organic sulfonic acid-based catalysts such as p-toluenesulfonic acid.

The amount of the esterification catalyst used may be set appropriately. Generally, the amount used is preferably within the range of 0.001 to 0.1 parts by mass based on 100 parts by mass of the total of the raw materials.

The form of the polyester resin (B1) used in the present invention varies depending on factors such as the Mn and composition of the modifying agent and is generally liquid, solid, paste, etc. at room temperature.

The amount of the polyester resin (B1) contained in the resin composition for an optical material according to the present invention varies depending on the photoelastic coefficient of the polymer (A) used and is preferably 0.1 to 15 parts by mass based on 100 parts by mass of the polymer because the absolute value of the photoelastic coefficient of the resin composition can be reduced. The amount of the polyester resin (B1) is more preferably 1 to 10 parts by mass and still more preferably 2 to 8 parts by mass.

The optical film of the present invention is characterized by containing the resin composition for an optical material according to the present invention. One feature of the optical film of the present invention is that its photoelastic coefficient is extremely small. Specifically, the absolute value of the photoelastic coefficient is $2.0 \times 10^{-12}$/Pa or less and more preferably $1.0 \times 10^{-12}$/Pa or less. The optical film of the present invention has a small photoelastic coefficient as described above. Therefore, the change in birefringence due to external force is small, and this allows a liquid crystal display device that resists a change displayed image due to external force to be provided.

In the present invention, the photoelastic coefficient was measured using the following method.

<Method of Measuring Photoelastic Coefficient ($C_R$)>

A stretched optical film obtained as an example of the optical film of the present invention is used. This optical film is cut in the stretching direction to obtain a measurement sample having a width of 15 mm. The measurement sample is fixed to a photoelasticity measurement tensile jig (manufactured by Oji Scientific Instruments). Then a tensile load on the measurement sample is changed from 127.3 g·f to 727.3 g·f in increments of 100 g·f, and a change in in-plane retardation at 588 nm is measured at each load using a retardation measurement device KOBRA-WR (manufactured by Oji Scientific Instruments). The measurement is performed in an atmosphere of 23° C. and a relative humidity of 55%.

The composition for an optical material according to the present invention can be used to produce various optical components. Particularly, the composition for an optical material according to the present invention can be used to produce a film-shaped component (optical film). For example, the optical film produced may be stretched in at least one direction. The absolute value of the photoelastic coefficient of this optical film is $2(\times 10^{-12}$/Pa) or less, and the optical film can be suitably used for applications such as retardation films that need retardation and are required to have such characteristics that the change in birefringence due to stress is small. The retardation film is preferably an optical film with the absolute value of the photoelastic coefficient being $1(\times 10^{-12}$/Pa) or less and more preferably an optical film with the absolute value of the photoelastic coefficient being $0.5(\times 10^{-12}$/Pa) or less. An optically isotropic optical film having a small birefringence and also a retardation film having a large birefringence can be obtained by controlling the amount of the polyester-based resin (B1) and selecting the degrees of stretching of the optical films in TD and MD directions appropriately according to their intended purpose.

A polymer other than the polymer (A) and the polyester resin (B1) may be mixed with the resin composition for an optical material according to the present invention so long as the object of the present invention is not impaired. Examples of the polymer other than the polymer (A) and the polyester resin (B1) include: polyolefins such as polyethylene and polypropylene; styrene-based resins such as polystyrene and styrene-acrylonitrile copolymers; thermoplastic resins such as polyamides, polyphenylene sulfide resins, polyether ether ketone resins, polyesters other than the polyester resin (B1), polysulfones, polyphenylene oxide, polyimides, polyetherimides, and polyacetals; and thermosetting resins such as phenolic resins, melamine resins, silicone resins, and epoxy resins. One of them may be mixed, or two or more types may be mixed.

Moreover, any additive may be added according to the intended purpose so long as the advantageous effects of the present invention are not significantly impaired. No particular limitation is imposed on the type of the additive so long as it is an additive generally used for preparation of resins and rubber-like polymers. Examples of the additive include: inorganic fillers; pigments such as iron oxides; lubricants such as stearic acid, behenic acid, zinc stearate, calcium stearate, magnesium stearate, and ethylenebisstearamide; release agents; softeners and plasticizers such as paraffin-based process oils, naphthene-based process oils, aromatic-based process oils, paraffins, organic polysiloxanes, and mineral oils; antioxidants such as hindered phenol-based antioxidants, phosphorus-based thermal stabilizers, lactone-based thermal stabilizers, and vitamin E-based thermal stabilizers; light stabilizers such as hindered amine-based light stabilizers and benzoate-based light stabilizers; UV absorbers such as benzophenone-based UV absorbers, triazine-based UV absorbers, and benzotriazole-based UV absorbers; flame retardants; antistatic agents; reinforcing agents such as organic fibers, glass fibers, carbon fibers, and metal whiskers; coloring agents; other additives; and mixtures thereof.

No particular limitation is imposed on the method of producing the resin composition for an optical material according to the present invention, so long as the resin composition contains the polymer (A) and the polyester resin (B1). Specifically, the resin composition can be obtained by, for example, a method in which the polymer (A), the polyester resin (B1), and, if necessary, any of the above additives are melt-kneaded using a melt kneader such as a single screw extruder, a twin screw extruder, a Banbury mixer, a Brabender, or any of other various kneaders.

The optical film of the present invention is characterized by containing the resin composition for an optical material according to the present invention. To obtain the optical film of the present invention, a method such as extrusion or casting is used. Specifically, an unstretched optical film can be formed by extrusion using, for example, an extruder equipped with a T die, a circular die, etc. When the optical film of the present invention is obtained by extrusion, the resin composition for an optical material according to the present invention that is obtained by melt-kneading the polymer (A) and the polyester resin (B1) in advance may be used. Alternatively, the polymer (A) and the polyester resin (B1) may be melt-kneaded at the time of extrusion and then directly extruded. Alternatively, the unstretched optical film of the present invention can be obtained by a solution casting method (solvent casting method). Specifically, a solvent that can dissolve the polymer (A) and polyester resin (B1) components is used to dissolve the polymer (A) and the polyester resin (B) in the solvent to thereby obtain a so-called dope solution, and then casting is performed.

The solution casting method will next be described in detail. The optical film obtained by the solution casting method is substantially optically isotropic. The optically isotropic film can be used for, for example, optical materials for liquid crystal displays and is particularly useful for protective films for polarizing plates. In the film obtained by the above method, irregularities are less likely to be formed on its surface, and the film has high surface smoothness.

Generally, the solution casting method includes a first step of dissolving the polymer (A) and the polyester resin (B1) in an organic solvent and casting the obtained resin solution onto a metal support, a second step of removing the organic solvent contained in the casted resin solution by evaporation to perform drying to thereby form a film, and a subsequent third step of peeling the film formed on the metal support from the metal support and then heat-drying the film.

Examples of the metal support used in the first step include endless belt-shaped and drum-shaped metal-made supports. For example, a stainless steel-made support with a mirror-polished surface can be used.

When the resin solution is casted onto the metal support, it is preferable to filtrate the resin solution through a filter before use in order to prevent foreign bodies from being mixed into a film to be obtained.

No particular limitation is imposed on the drying method in the second step. For example, a method can be used in which wind in the temperature range of 30 to 50° C. is applied to the upper and/or lower surface of the metal support to evaporate 50 to 80% by mass of the organic solvent contained in the casted resin solution, whereby a film is formed on the metal support.

In the third step, the film formed in the second step is peeled from the metal support and heat-dried under a temperature condition higher than that in the second step. The heat-drying method is preferably a method in which temperature is increased stepwise under the temperature condition of, for example, 100 to 160° C. because good dimensional stability can be achieved. By performing the heat-drying under the above-described temperature condition, the organic solvent remaining in the film after the second step can be removed almost completely.

The organic solvent may be collected in the first to third steps and reused.

No particular limitation is imposed on the organic solvent that can be used when the polymer (A) and the polyester resin (B) are mixed with and dissolved in the organic solvent so long as the organic solvent can dissolve these materials. Examples of the organic solvent include solvents such as chloroform, methylene dichloride, and methylene chloride.

The concentration of the polymer (A) in the resin solution is preferably 10 to 50% by mass and more preferably 15 to 35% by mass.

The thickness of the optical film of the present invention is preferably within the range of 20 to 120 μm, more preferably within the range of 25 to 100 μm, and particularly preferably within the range of 25 to 80 μm.

In the present invention, the unstretched optical film obtained by, for example, any of the above-described methods is optionally subjected to longitudinal uniaxial stretching in a mechanical flow direction or transverse uniaxial stretching in a direction orthogonal to the mechanical flow direction, and a stretched optical film can thereby be obtained. A biaxially stretched film can be obtained by a stretching method such as a sequential biaxial stretching method including roll stretching and tenter stretching, a simultaneous biaxial stretching method including tenter stretching, or a biaxial stretching method including tubular stretching. The degree of stretching is preferably 0.1% or more and 1,000% or less in at least one of the above directions, more preferably 0.2% or more and 600% or less, and particularly preferably 0.3% or more and 300% or less. When the degree of stretching is designed within this range, the stretched optical film obtained has preferable birefringence, heat resistance, and strength.

The optical film according to the present invention can be suitably used as an optical material for polarizing plate protective films, protective films, retardation films such as ¼ wave plates, ½ wave plates, view angle control films, and liquid crystal optical compensation films, display front plates, etc. that are used in displays such as liquid crystal display devices, plasma displays, organic EL displays, field emission displays, and rear projection TVs. Moreover, the resin composition for an optical material according to the present invention can be used for waveguides, lenses, optical fibers, base materials of optical fibers, coating materials, lenses of LEDs, lens covers, etc., in the fields of optical communications systems, optical switching systems, and optical measurement systems.

EXAMPLES

The present invention will next be described more specifically by way of Examples. In the Examples, "part" and "%" are based on mass, unless otherwise specified.

Synthesis Example 1 [Synthesis of Polyester Resin (B1)]

A 3 L four-neck flask equipped with a thermometer, a stirrer, a reflux condenser, and a nitrogen introduction tube was charged with 476 g of 1,2-propylene glycol, 554 g of dimethyl terephthalate, and 817 g of p-toluic acid and was heated. When the temperature inside the flask reached 130° C., tetraisopropyl titanate used as an esterification catalyst was added in an amount of 60 ppm with respect to the total amount of 1,2-propylene glycol, dimethyl terephthalate, and p-toluic acid. The mixture was heated from 170° C. to 220° C. at a heating rate of 10° C./hour under stirring in a nitrogen flow while water and methanol generated were removed by evaporation. Then a condensation reaction was allowed to proceed at 220° C. for 15 hours. After the reaction, unreacted 1,2-propylene glycol and oligomers were removed by evaporation under reduced pressure at 200° C. to thereby obtain a polyester resin (B1-1) having a number average molecular weight of 450, an acid value of 0.19, and a hydroxyl value of 11.

Synthesis Example 2 (the Same as the Above)

The same procedure as in Synthesis Example 1 was repeated except that 224 g of ethylene glycol, 274 g of 1,2-propylene glycol, 871 g of terephthalic acid, and 272 g of p-toluic acid were used to thereby obtain a polyester resin (B1-2) having a number average molecular weight of 1,060, an acid vale of 0.43, and a hydroxyl value of 16.

Synthesis Example 3 (the Same as the Above)

The same procedure as in Synthesis Example 1 was repeated except that 468 g of 1,2-propylene glycol, 524 g of dimethyl terephthalate, and 733 g of benzoic acid were used to thereby obtain a polyester resin (B1-3) having a number average molecular weight of 450, an acid vale of 0.07, and a hydroxyl value of 4.

Synthesis Example 4 [Synthesis of Control Polyester Resin (b'1)]

A 1 L four-neck flask equipped with a thermometer, a stirrer, and a reflux condenser was charged with 341 g of ethylene glycol and 659 g of adipic acid. Then tetraisopropyl titanate was added in an amount of 30 ppm with respect to the total amount of ethylene glycol and adipic acid. The mixture was heated to 220° C. under stirring in a nitrogen flow and allowed to react for 24 hours to thereby obtain a control polyester resin (b'1-1) having a number average molecular weight of 1,100, an acid value of 0.19, and a hydroxyl value of 112.

Synthesis Example 5 (the Same as the Above)

The same procedure as in Synthesis Example 4 was repeated except that 770 g of succinic acid and 595 g of 1,2-propylene glycol were used to thereby obtain a control polyester resin (b'1-2) having a number average molecular weight of 11,000, an acid value of 0.7, and a hydroxyl value of 8.

Example 1 (Preparation of Resin Composition for Optical Material)

100 Parts of an acrylic resin (A1) [a copolymer of methyl methacrylate/maleic anhydride/styrene=50/40/10 (molar ratio), number average molecular weight: 27,800)] and 5 parts of the polyester resin (B1-1) were added to and dissolved in a solvent mixture composed of 270 parts of methylene chloride and 30 parts of methanol to obtain a resin composition (a dope solution) for an optical material according to the present invention.

The dope solution was casted onto a glass plate to a thickness of 0.5 mm, dried at room temperature for 16 hours, and further dried at 50° C. for 30 minutes and then at 100° C. for 60 minutes to obtain an unstretched film having a thickness of 100 μm.

The obtained unstretched film was uniaxially stretched (stretching ratio: 2, stretching speed: 100%/minute) at a temperature of 5° C.+the glass transition temperature (Tg) of the resin composition for an optical material (1) determined by a differential scanning calorimeter (DSC) to thereby produce a stretched film (1). The Tg was measured using the differential scanning calorimeter (DSC) under the following conditions.

<Conditions for Measurement of Glass Transition Temperature Tg>

A differential scanning calorimeter DSC822e (manufactured by METTLER TOLEDO) was used. Specifically, 5 mg of the resin composition was placed in a light-weight aluminum pan, heated from 25° C. to 150° C. at 10° C./minute in a nitrogen atmosphere (1st run), quenched to 0° C., and again heated from 0° C. to 150° C. at 10° C./minute (2nd run). The glass transition temperature Tg was determined from the DSC curve obtained in the 2nd run by a midpoint method.

The optical characteristics of the obtained stretched film (1), specifically in-plane birefringence (Δn), out-of-plane birefringence (ΔP), photoelastic coefficient ($C_R$), and haze, were evaluated according to the following methods. The evaluation results are shown in Table 1.

<Method of Evaluating in-Plane Birefringence (an) and Out-of-Plane Birefringence (AP)>

A retardation measurement device KOBRA-WR (manufactured by Oji Scientific Instruments) was used to measure refractive indexes at 588 nm, and the in-plane birefringence (Δn) and the out-of-plane birefringence (ΔP) were determined using the following formulas.

In-plane birefringence $(\Delta n)=(n_x)-(n_y)$

Out-of-plane birefringence $(\Delta P)=[(n_x)+(n_y)]/2-(n_z)$

[($n_x$): refractive index in stretching direction, ($n_y$): refractive index in direction orthogonal to stretching direction, ($n_z$): refractive index in direction of film thickness]

The measurement was performed in an atmosphere of 23° C. and a relative humidity of 55%.

<Method of Evaluating Photoelastic Coefficient ($C_R$)>

The stretched film was cut in a direction parallel to the stretching direction to obtain a cut stretched film having a width of 15 mm. The cut stretched film was fixed to a photoelasticity measurement tensile jig (manufactured by Oji Scientific Instruments). A load was changed from 127.3 g·f to 727.3 g·f in increments of 100 g·f, and a change in in-plane retardation (Re) at 588 nm was measured using the retardation measurement device KOBRA-WR (manufactured by Oji Scientific Instruments). The measurement was performed in an atmosphere of 23° C. and a relative humidity of 55%. The in-plane retardation (Re) was determined using the following formula.

$Re=(n_x-n_y) \times d$

[($n_x$): refractive index in stretching direction, ($n_y$): refractive index in direction orthogonal to stretching direction, d: film thickness (μm)]

The measured values were plotted with stress (σ) on the horizontal axis and in-plane retardation (Re) on the vertical axis, and the photoelastic coefficient ($C_R$) was determined from the gradient of a straight line in a linear region using the least square method. The smaller the absolute value of the gradient, the closer the photoelastic coefficient is to 0. An optical film with a smaller photoelastic coefficient exhibits a smaller change in birefringence due to external force.

<Evaluation of Haze>

Evaluation was performed using NDH-5000 manufactured by NIPPON DENSHOKU INDUSTRIES Co., Ltd. according to JIS K 7136.

Examples 2 to 9 and Comparative Examples 1 to 6

Stretched films (2) to (9) and control stretched films (1') to (6') were obtained in the same manner as in Example 1 except that chemical compositions shown in Table 1 were used to obtain resin compositions (dope solutions) for an optical material. The films were evaluated in the same manner as in Example 1, and the evaluation results are shown in Tables 1 to 3.

TABLE 1

| (Parts) | | Example 1 | Example 2 | Example 3 | Comparative Example 1 | Comparative Example 2 | Comparative Example 3 |
|---|---|---|---|---|---|---|---|
| Chemical composition of composition used for preparation of optical film | Optical film | (1) | (2) | (3) | (1') | (2') | (3') |
| | Acrylic resin (A1) | 100 | 100 | 100 | 100 | 100 | 100 |
| | Polyester resin (B1-1) | 5 | | | | | |
| | Polyester resin (B1-2) | | 5 | | | | |
| | Polyester resin (B1-3) | | | 5 | | | |
| | Polyester resin (b'1-1) | | | | | 5 | |
| | Polyester resin (b'1-2) | | | | | | 10 |
| | Tg (° C.) of composition | 115 | 116 | 116 | 122 | 115 | 104 |
| | Stretching temperature (° C.) in film formation | 120 | 121 | 121 | 127 | 120 | 109 |
| | HAZE | 0.63 | 0.65 | 0.45 | 0.91 | >90 | 0.68 |
| | ΔP | −4.1 | −3.8 | −3.6 | −5.4 | Not measurable | −2.1 |
| | Δn (×10$^{-4}$) | −7.8 | −7.1 | −6.2 | −10.2 | Not measurable | −4.1 |
| | $C_R$ [×10$^{-12}$ (/Pa)] | −0.4 | 0.1 | 0.3 | −3.7 | Not measurable | −1.6 |

Footnote to Table 1
Not measurable: The haze of the film was large, and it was unable to measure its optical characteristics.

TABLE 2

| (Parts) | | Example 4 | Example 5 | Example 6 | Comparative Example 4 | Comparative Example 5 |
|---|---|---|---|---|---|---|
| Chemical composition of composition used for preparation of optical film | Optical film | (4) | (5) | (6) | (4') | (5') |
| | Acrylic resin (A2) | 100 | 100 | 100 | 100 | 100 |
| | Polyester resin (B1-1) | 4 | 4 | 6 | | |
| | Polyester resin (B1-2) | | | | | |
| | Polyester resin (B1-3) | | | | | |
| | Polyester resin (b'1-1) | | | | | |
| | Polyester resin (b'1-2) | | | | | 5 |
| | Tg (° C.) of composition | 116 | 116 | 112 | 120 | 112 |
| | Stretching temperature (° C.) in film formation | 121 | 111 | 117 | 125 | 117 |
| | HAZE | 0.30 | 0.35 | 0.38 | 0.51 | >99 |
| | ΔP | −0.7 | −0.7 | −0.7 | −0.8 | Not measurable |
| | Δn (×10$^{-4}$) | −1.2 | −1.7 | −0.9 | −1.1 | Not measurable |
| | $C_R$ [×10$^{-12}$ (/Pa)] | 0.6 | 0 | 0.6 | −2.5 | Not measurable |

Footnote to Table 2
Acrylic film (A2): Copolymer of methyl methacrylate/α-methylstyrene = 93/7 (molar ratio), number average molecular weight: 37,800)
Not measurable: The haze of the film was large, and it was unable to measure its optical characteristics.

TABLE 3

| (Parts) | | Example 7 | Example 8 | Example 9 | Comparative Example 6 |
|---|---|---|---|---|---|
| Chemical composition of composition used for preparation of optical film | Optical film | (7) | (8) | (9) | (6') |
| | Acrylic resin (A3) | 100 | 100 | 100 | 100 |
| | Polyester resin (B1-1) | 5 | | | |
| | Polyester resin (B1-2) | | 5 | | |
| | Polyester resin (B1-3) | | | 3 | |
| | Polyester resin (b'1-1) | | | | |
| | Polyester resin (b'1-2) | | | | |
| | Tg (° C.) of composition | 107 | 111 | 107 | 117 |
| | Stretching temperature (° C.) in film formation | 117 | 117 | 117 | 127 |
| | Δn (×10$^{-4}$) | −5.0 | −4.4 | −4.8 | −9.8 |
| | $C_R$ [×10$^{-12}$ (/Pa)] | −0.7 | −0.1 | −1.1 | −4.9 |

Footnote to Table 3
Acrylic film (A3): Homopolymer of methyl methacrylate,
number average molecular weight: 32,000) HAZE and ΔP were not measured.

Each of the optical films obtained by using the optical resin compositions of the present invention is a film that has a small photoelastic coefficient and exhibits only a small change in birefringence due to external force. However, in each of the optical films in Comparative Examples, the absolute value of the photoelastic coefficient is large, and therefore the change in birefringence due to external force is large.

The invention claimed is:

1. A resin composition for an optical material, comprising: a polymer (A) obtained by using (meth)acrylic acid or an alkyl (meth)acrylate; and a polyester resin (B); wherein
the polyester resin (B) is a polyester resin (B1) that has, in a main chain thereof, an aromatic ring-containing structural unit and has a number average molecular weight of 300 to 5,000, and an end of the main chain is capped with a monocarboxylic acid residue or a monoalcohol residue; and
the polymer (A) and the polyester resin (B) are mixed or blended together to form the resin composition.

2. The resin composition for an optical material according to claim 1, wherein
the polyester resin (B1) is represented by the following general formula (1):

$$B\text{-}(G_1\text{-}A_1)_n\text{-}G_1\text{-}B \tag{1}$$

(wherein B represents an aryl monocarboxylic acid residue having 6 to 12 carbon atoms or an aliphatic monocarboxylic acid residue having 1 to 8 carbon atoms, $G_1$ represents an alkylene glycol residue having 2 to 12 carbon atoms or an oxyalkylene glycol residue having 4 to 12 carbon atoms, $A_1$ represents an aryl dicarboxylic acid residue having 6 to 12 carbon atoms, and n represent an integer of 1 to 30).

3. The resin composition for an optical material according to claim 1, wherein the polyester resin (B1) is a polyester resin having a number average molecular weight of 350 to 3,000.

4. The resin composition for an optical material according to claim 2, wherein, in general formula (1), B is a benzoic acid residue or a p-toluic acid residue, $G_1$ is an ethylene glycol residue or a propylene glycol residue, and $A_1$ is a terephthalic acid residue or a dimethyl terephthalate residue.

5. The resin composition for an optical material according to claim 1, wherein the amount of the polyester resin (B1) is 0.1 to 15 parts by mass based on 100 parts by mass of the polymer (A).

6. The resin composition for an optical material according to claim 1, wherein the polymer (A) is obtained by polymerization using methyl methacrylate.

7. An optical film comprising the resin composition for an optical material according to claim 1.

8. The optical film according to claim 7, wherein the optical film is an optical film for protecting a polarizing plate.

9. A liquid crystal display device comprising the optical film according to claim 7.

* * * * *